United States Patent
Di Fonzo et al.

(10) Patent No.: US 12,494,493 B2
(45) Date of Patent: Dec. 9, 2025

(54) ELECTRODE FOR A FLOW BATTERY AND PRODUCTION METHOD

(71) Applicants: FONDAZIONE ISTITUTO ITALIANO DI TECNOLOGIA, Genoa (IT); POLITECNICO DI MILANO, Milan (IT)

(72) Inventors: Fabio Di Fonzo, Milan (IT); Eugenio Rovera, Varese (IT); Andrea Casalegno, Milan (IT); Matteo Zago, Cantù (IT); Giorgio Nava, Riverside, CA (US); Francesco Fumagalli, Cassago Brianza (IT)

(73) Assignees: FONDAZIONE ISTITUTO ITALIANO DI TECNOLOGIA, Genoa (IT); POLITECNICO DI MILANO, Milan (IT)

( * ) Notice: Subject to any disclaimer, the term of this patent is extended or adjusted under 35 U.S.C. 154(b) by 651 days.

(21) Appl. No.: 17/911,120

(22) PCT Filed: Mar. 11, 2021

(86) PCT No.: PCT/IB2021/052020
§ 371 (c)(1),
(2) Date: Sep. 12, 2022

(87) PCT Pub. No.: WO2021/181319
PCT Pub. Date: Sep. 16, 2021

(65) Prior Publication Data
US 2023/0163320 A1    May 25, 2023

(30) Foreign Application Priority Data
Mar. 13, 2020    (IT) .................. 102020000005482

(51) Int. Cl.
H01M 4/96    (2006.01)
H01M 4/86    (2006.01)
(Continued)

(52) U.S. Cl.
CPC .......... *H01M 4/96* (2013.01); *H01M 4/8605* (2013.01); *H01M 4/861* (2013.01);
(Continued)

(58) Field of Classification Search
None
See application file for complete search history.

(56) References Cited

U.S. PATENT DOCUMENTS

2012/0258345 A1   10/2012   Zaffou et al.
2017/0294658 A1   10/2017   Jin et al.
2022/0153591 A1*   5/2022   Morimoto ............... H01M 8/18

FOREIGN PATENT DOCUMENTS

CN    107785587    *   3/2018
CN    110197905    *   9/2019
(Continued)

OTHER PUBLICATIONS

Young-Jin Ko et al., "Onion-like carbon as dopant/modification-free electrocatalyst for [VO]2+/{VO2}+ redox reaction: Performance-control mechanism," Carbon 127 (2018), 31-40.*
(Continued)

*Primary Examiner* — Jonathan Crepeau
(74) *Attorney, Agent, or Firm* — Maschoff Brennan

(57) ABSTRACT

An electrode for a flow battery and a method for producing the electrode enable the electrode to be placed in contact with an electrolytic solution of the flow battery. The electrode includes a first portion consisting of particles of electrically conductive material having nanometric dimensions. The first portion is mesoporous with a porosity that
(Continued)

increases the quantity of redox reactions per time unit in a flow of the electrolytic solution of the battery.

18 Claims, 9 Drawing Sheets

(51) Int. Cl.
  *H01M 4/88* (2006.01)
  *H01M 8/18* (2006.01)
(52) U.S. Cl.
  CPC ....... *H01M 4/8657* (2013.01); *H01M 4/8867* (2013.01); *H01M 8/188* (2013.01)

(56) References Cited

FOREIGN PATENT DOCUMENTS

| | | |
|---|---|---|
| DE | 10 2013 217882 A1 | 3/2015 |
| WO | 2011/064392 A2 | 6/2011 |
| WO | 2014/121276 A2 | 8/2014 |

OTHER PUBLICATIONS

González, Zoraida, et al. Carbon nanowalls thin films as nanostructured electrode materials in vanadium redox flow batteries. Nano Energy, Nov. 2012, 1.6: 833-839.

\* cited by examiner

ELECTRODE FOR A FLOW BATTERY AND PRODUCTION METHOD

The present invention relates to an electrode for a flow battery and a method for producing said electrode; in particular, the present invention relates to an electrode for a vanadium flow battery and a method for producing said electrode, i.e., a battery wherein at least one of the two electrolytes contains vanadium ions.

As is known, the maximum electric power that can be delivered by a flow battery is actually independent of the electric capacity of said battery; in fact, the maximum electric power depends on the characteristics of the cell (i.e., the size of the electrodes and their chemical-physical characteristics, the size and type of the ion-exchange membrane interposed between the two electrodes and the two electrolytic solutions in use, the number of electrodes per half-cell, etc.), while the electric capacity mainly depends on the type of electrolyte and redox species employed and the total quantity thereof stored in the tanks. It can therefore be stated that a flow battery permits making the maximum electric power that can be delivered by said battery independent of the electric capacity of the same.

This peculiarity allows flow batteries to be optimally sized for specific applications, e.g., for coupling them to power plants using renewable sources (e.g., photovoltaic, aeolian, hydroelectric, wave, etc. power plants); in fact, renewable sources are characterized by a power-to-energy ratio following a seasonal trend (particularly photovoltaic and aeolian power plants), i.e., maximum power is almost always obtained in all seasons, but the energy produced on a daily basis varies according to the period of the year.

At present, flow batteries have an energy density which is lower than that of lithium-ion batteries, the capacity of which is nevertheless correlated with maximum power and tends to decrease as the batteries grow old. Moreover, the size of the single elements of a lithium battery is dictated by safety regulations and cooling requirements.

Article "GONZALEZ, Zoraida, et al. Carbon nanowalls thin films as nanostructured electrode materials in vanadium redox flow batteries. *Nano Energy,* 2012, 1.6: 833-839." describes a solution that envisages the creation of carbon nanowalls (CNWs) on a gold electrode, so as to increase the reaction surface of the electrode; such electrode is then used in a positive half-cell of a vanadium flow battery. This solution provides a more compact electrode, but it does not increase the kinetics of the redox reactions on the surface of said electrode. Therefore, in addition to being economically unfavourable because it requires the use of a gold electrode, this solution does not achieve any significant increase in terms of specific power of a vanadium flow battery.

The present invention aims at solving these and other problems by providing an electrode for a flow battery.

Furthermore, the present invention aims at solving these and other problems by providing also a method for producing an electrode for a flow battery.

The basic idea of the present invention is to produce and use an electrode comprising a portion adapted to be placed in contact with an electrolytic solution of a flow battery, wherein said portion has a mesoporous structure (i.e., a structure containing pores having a diameter in the range of approximately 1 to 100 nanometers) consisting of particles of electrically conductive material having nanometric dimensions, such as to increase the kinetics of the redox reactions in a flow of said electrolytic solution and/or the number of active sites per surface unit and/or the electrode area, so as to increase the current produced per projected surface unit of the electrode.

The use of nanometric particles of electrically conductive material for creating a mesoporous structure of an electrode for a flow battery produces the technical effect of permitting an electrolyte flow to pass through said electrode while at the same time increasing the number of active sites per electrode surface unit whereon electrons are exchanged, increasing the electrode area in contact with the electrolyte, and increasing the kinetics of the redox reactions (which occur on the electrode surfaces in contact with the electrolytic solutions during the normal charge/discharge process of the flow battery) in said flow, thereby advantageously producing an electrocatalysis phenomenon in an electrolyte flowing through the electrode according to the invention. In other words, the invention achieves the technical effect of increasing the quantity per time unit of redox reactions in a flow of electrolytic solution, thus increasing the current density per projected surface unit of the electrode.

This advantageously permits increasing the power density in a flow battery; in particular, a preferred embodiment of the electrode according to the invention can generate an amount of current per surface unit which is three times greater (with an efficiency in excess of 80%) than the current generated by an electrode according to the prior art.

Furthermore, the electrocatalysis produces an advantageous reduction of the overpotential of the electrode, thus making it possible to increase the current density of the battery; in fact, the reduced electrode overpotential has, as a macroscopic effect, a reduction of the internal resistance (that is, not only the ohmic resistance, but also the electrochemical resistance) of the battery, and hence of the internal voltage drop of said battery. Indeed, experimental tests have shown that, when used as the negative pole, the electrode according to the invention allows the single cells of a vanadium flow battery to operate within the range of 1.0-1.8 Volts at a charge/discharge current at least twice as high as that of prior-art batteries. As a matter of fact, this can be achieved because the overpotential reduction advantageously makes it possible to reduce the quantity of hydrogen and oxygen that can be generated when high currents are applied during the charge or discharge phases, thus allowing the battery to manage particular situations in which it is necessary to absorb or deliver high-intensity currents.

The use of such flow batteries is therefore advantageous over prior-art flow batteries, e.g., in applications requiring the use of such batteries for large plants for the production of electric energy from renewable sources, such as photovoltaic, aeolian, etc. plants, where power production follows a highly variable trend.

Moreover, an electrode according to the invention makes it possible to reduce its oxidation and/or the formation of hydrogen or oxygen on its surface, thus advantageously reducing its degradation, so that the performance of the flow battery will remain unchanged for a greater number of charge/discharge cycles in comparison with other battery types.

Further advantageous features of the present invention will be set out in the appended claims.

These features as well as further advantages of the present invention will become more apparent in the light of the following description of a preferred embodiment thereof as shown in the annexed drawings, which are provided merely by way of non-limiting example, wherein.

In this description, any reference to "an embodiment" will indicate that a particular configuration, structure or feature is comprised in at least one embodiment of the invention.

Therefore, expressions such as "in an embodiment" and the like, which can be found in different parts of this description, will not necessarily refer to the same embodiment. Moreover, any particular configuration, structure or feature may be combined as deemed appropriate in one or more embodiments. The references below are therefore used only for simplicity's sake, and shall not limit the protection scope or extension of the various embodiments.

Figure 1:
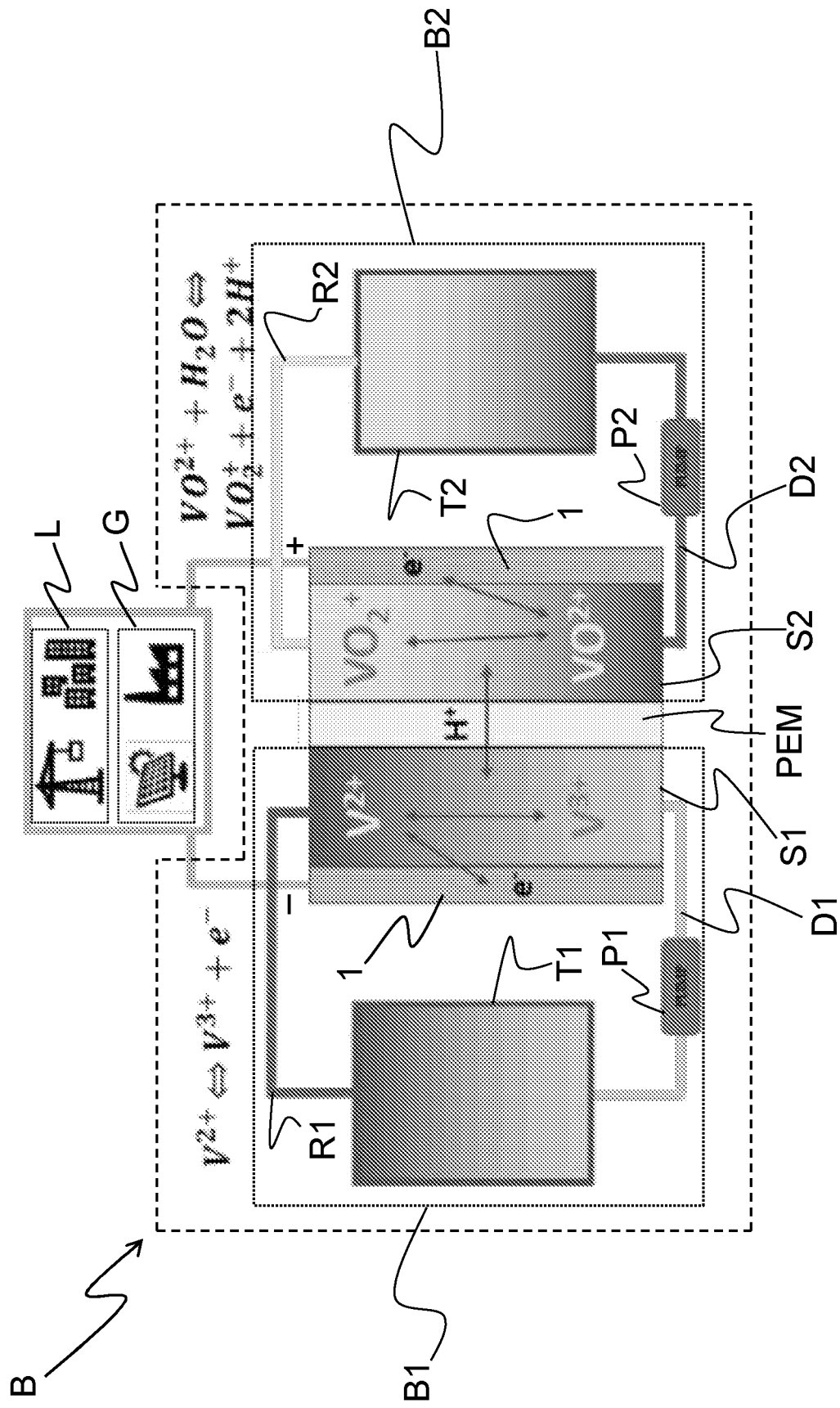
FIG. 1 shows a simplified diagram of the operation of a flow battery comprising an electrode according to the invention.

With reference to FIG. 1, the following will describe a battery B comprising at least one electrode 1 according to the invention; preferably, such electrode 1 has a planar shape.

It must be pointed out that, in this description, the term "electrode" refers to that component of a battery on the surface of which redox reactions occur during the charging or discharging of said battery.

The battery B comprises a negative portion B1 and a positive portion B2, wherein the negative portion B1 comprises a negative half-cell S1, a first tank T1 and a first pump P1, and wherein the positive portion B2 comprises a positive half-cell 32, a second tank T2 and a second pump P2.

The negative half-cell S1 is in flow communication with the first tank T1 through a first delivery duct G_1 and a first return duct R1, wherein said first tank T1, the ducts D1,R1 and the negative half-cell S1 contain a first electrolytic solution, and wherein the first pump P1 is preferably positioned along the first delivery duct D1, so that said first pump P1 will generate, when it is in an operating condition, a flow of said first electrolytic solution within the negative half-cell S1.

Similarly to the negative half-cell S1, the positive half-cell 32 is in flow communication with the second tank T2 through a second delivery duct D2 and a second return duct R2, wherein said second tank T2, the ducts D2,R2 and the positive half-cell 32 contain a second electrolytic solution, and wherein the second pump P2 is preferably positioned along the second delivery duct D2, so that said second pump P2 will generate, when it is in an operating condition, a flow of said second electrolytic solution within the positive half-cell S2.

The battery B2 comprises also an ion-exchange membrane (e.g., a membrane made of Nafion or another material) comprising a first face and a second face, wherein said faces are touched by the first electrolytic solution, contained in the negative half-cell S1, and by the second electrolytic solution, contained in the positive half-cell S2, respectively.

In addition, at least one of the reaction half-cells S1,S2 comprises the electrode 1 according to the invention. In the preferred embodiment, the negative half-cell 31 comprises one such electrode 1, while the positive half-cell S2 preferably comprises a conventional electrode according to the prior art (e.g., a carbon electrode) or an electrode 1 according to the invention. To said electrodes, at least one electric load L and/or a generator G may be connected.

The first and second electrolytic solutions are preferably solutions containing vanadium ions. This advantageously permits the use of an identical starting solution for both the negative portion B1 and the positive portion B2; such a starting solution is, for example, an aqueous solution of vanadium sulphate (brute formula $VOSO_4$). It should be noted, in fact, that the vanadium element has five oxidation states (+1, +2, +3, +4, +5), four of which (+2, +3, +4, +5) can be effectively exploited for electrochemical use. This makes it possible to create, starting from said starting solution and using methods well known in the art, the first electrolytic solution with vanadium in the +2 and/or +3 oxidation states (negative portion B1) and the second electrolytic solution with vanadium in the +4 and/or +5 oxidation states (positive portion B2).

When the battery B is in an operating condition and the generator G is recharging the battery B, the vanadium in the first electrolytic solution (negative portion B1) is reduced and, by absorbing electrons, switches from the +3 oxidation state to the +2 oxidation state, while the varnadium in the second solution (positive portion B2) is oxidized and, by yielding electrons, switches from the +4 oxidation state ($VO^{2+}$) to the +5 oxidation state ($VO_2^+$).

When the battery B is in an operating condition and the electric load L is discharging the battery B, the vanadium in the first electrolytic solution (negative portion B1) is oxidized and, by yielding electrons, switches from the +2 oxidation state to +3 oxidation state, while the vanadium in the second solution (positive portion B2) is reduced and, by absorbing electrons, switches from the +5 oxidation state ($VO_2^+$) to the +4 oxidation state ($VO^{2+}$).

Nevertheless, it is still possible to lase dissimilar electrolytic solutions or solutions of another nature (aqueous or with an organic solvent and containing active species such as iodides, sulphides and bromides, alkaline metals (lithium, sodium, etc.) or transition metals (iron, chrome, titanium, tin, zinc, cerium, manganese, etc.) or organic molecules and redox polymers (quinones, methyl viologen, ACA, ferrocyanides, TEMPO, PANT, PNB-g-PTMA, polythiophenes) or solid particles, etc.), without however departing from the teachings of the present invention.

The electrolytic solutions employed comprise a solvent, which is preferably water. In combination with or as an alternative to water, it is also possible to use an organic solvent (e.g., acetonitrile, dimethyl sulfoxide, propylene carbonate, ethyl carbonate, dioxolane, etc.) or ionic liquids (e.g., 1-ethyl-3-methylimidazolium chloride (EMICl)/FeCl3/FeCl2, tetrabutylammonium hexafluorophosphate (TEAPF6), 1-ethyl-3-methyl imidazolium hexafluorophosphate (EmIPF6)).

The electrode 1 according to the invention comprises a first portion having a mesoporous (physical) structure, i.e., a structure comprising pores having a diameter in the range of approximately 1 to 100 nanometers, wherein said first portion is adapted to be placed in contact with one of the electrolytic solutions of said battery B and consists of particles of electrically conductive material having nanometric dimensions. The porosity of said first portion is such as to allow the diffusion therein of a flow of electrolytic solution and, advantageously, to increase the quantity per time unit of redox reactions in said flow, wherein said flow is preferably generated by one of the pumps P1,P2.

In this manner, it is advantageously possible to increase the power density in a flow battery.

The first portion of the electrode 1 may constitute the whole body of such electrode 1, i.e., the mesoporous (first) portion can be used as an independent electrode.

In the preferred embodiment of the invention, said mesoporous portion may be supported by other structural elements of the battery B, such as, for example, commercially available carbon fiber electrodes, or by other substrates, such as, for example, gas diffusion layers (GDLs, like the Sigracet® 29AA substrate), membranes, current collectors, foams and/or metallic/polymeric meshes, electrospun materials or other types of materials available on the market.

As will be further described below, the preferred embodiment of the electrode 1 comprises a second portion, wherein said first portion is constrained to said second portion so that said second portion acts as a support for said first portion. In other words, said second portion supports said first portion.

It is thus advantageously possible to increase the power and energy density in a flow battery already available on the market, since the overpotential of the electrode can be reduced by promoting the transfer of the electrolyte towards the first portion of the electrode and/or by increasing the reaction kinetics.

The particles of electrically conductive material having nanometric dimensions may be zero-dimensional (0D nanoparticles) and/or two-dimensional (2D nanoplatelets). It must be pointed out that it is also possible to employ a mixture of zero-dimensional and two-dimensional particles.

Preferably, such nanoparticles may be of any conductive material, such as, for example, a material belonging to any one of the following compound classes: carbon, metals, nitrides, borides, carbides, oxides, chalcogenides or the like. More preferably, such nanoparticles may comprise carbon nitride ($C_3N_4$), carbon and nitrogen compounds ($CN_x$ with $0<x<4/3$), graphene, reduced graphene oxide, carbon nanoparticles, carbon nanotubes, fullerenes, titanium nitride (TiN), titanium oxynitrides, titanium oxides ($TiO_x$ $0<x<2$), molybdenum oxides ($MoO_x$ with $0<x<3$), tungsten oxides ($WO_x$ $0<x<3$), tungsten oxynitrides, tungsten nitride, tin oxides ($SnO_x$ $0<x\leq 2$), indium and indium oxides, iridium oxide ($IrO_2$), ruthenium and ruthenium oxide, bismuth and oxides thereof, borides, nitrides, carbides and chalcogenides, tellurium, manganese, niobium, yttrium, zirconium, hafnium, gallium, lead, lanthanum, cerium and/or other lanthanides, titanium, molybdenum, tungsten, iron, nickel, aluminium.

Figure 2:
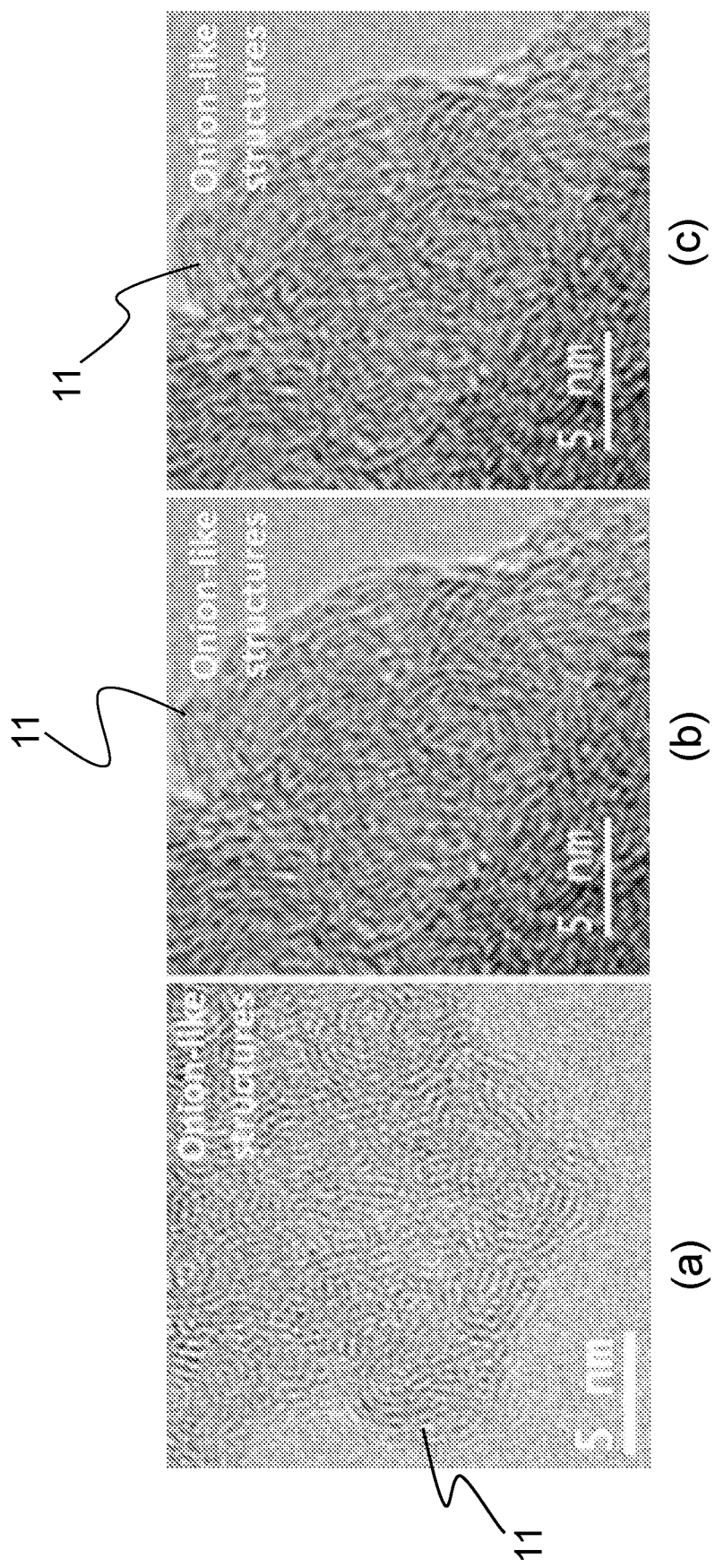
FIGS. 2a-2c show three images acquired by a scanning electron microscope, which represent the results that can be obtained by executing a production method according to the invention at different levels of radiating power.

Also with reference to FIG. 2, in the preferred embodiment of the invention the conductive particles are carbon nanoparticles; such carbon nanoparticles have an onion-like structure, i.e., said particles have a concentric-layered structure 11. It has been surprisingly observed that this type of structure promotes electrocatalysis in a flow of electrolyte, thus advantageously increasing the power and energy density of the battery B.

It has been observed that the electrocatalysis is further improved (i.e., the quantity per time unit of redox reactions further increases) when said particles have a size (i.e., a diameter) in the range of 1 to 50 nanometers, and even more preferably when the size is in the range of 4 to 5 nanometers.

The assembly of the particles (e.g., obtained by means of a supersonic jet followed by thermal treatment in a vacuum or controlled atmosphere) provides a certain degree of porosity within the first portion of the electrode 1. The porosity resulting from this assembly of particles may range from 1 to 50 nanometers, i.e., the formed pores may have a diameter in the range of 1 to 50 nanometers.

More in detail, it must be pointed out that the average size of the pores may be defined as a function of the steric impedance of the active species employed in the battery, wherein the term "active species" refers to the ions that participate in the redox reactions that permit storing and then delivering electric energy. In particular, the average size of the pores may be selected from 1 to 10 nanometers when the electrolyte in use includes active species such as vanadium and/or other ionic species or active redox molecules with a molar mass lower than 1,000 grams/mole, such as, for example, compounds of the families of quinones (benzoquinones, anthraquinones, etc.), alcoxy-benzenes, derivatives of 2,2,6,6-tetramethyl-1-piperidinyloxy (TEMPO), N-methyl phthalimide, etc.

If redox species having a high molecular weight are used, particularly particles of polymers (e.g., derivatives of polyaniline, of poly(vinyl-benzyl ethyl viologen), of the class of the so-called "bottlebrush" polymers, of 2,2,6,6-tetramethyl-1-piperidinyloxy (TEMPO), polythiophenes, hydrosoluble polymers such as polymethacrylates and polystyrenes, boron-dipyrromethenes, etc., it will be possible to use pores having an average diameter of 10 to 100 nm.

The pore size may also be adapted to the viscosity of the electrolyte; for example, pores having an average diameter of 1 to 10 nanometers are more suited for low-viscosity electrolytic solutions, whereas pores having an average diameter of 10 to 100 nanometers are more suited for high-viscosity electrolytic solutions.

In addition, the pore size may be chosen to comply with the steric hindrance of the active species and with the viscosity of the electrolyte.

By using the above-specified porosity and active elements, it is possible to increase the redox reactions. It is thus advantageously possible to increase the power and energy density in a flow battery already available on the market.

Figure 3:
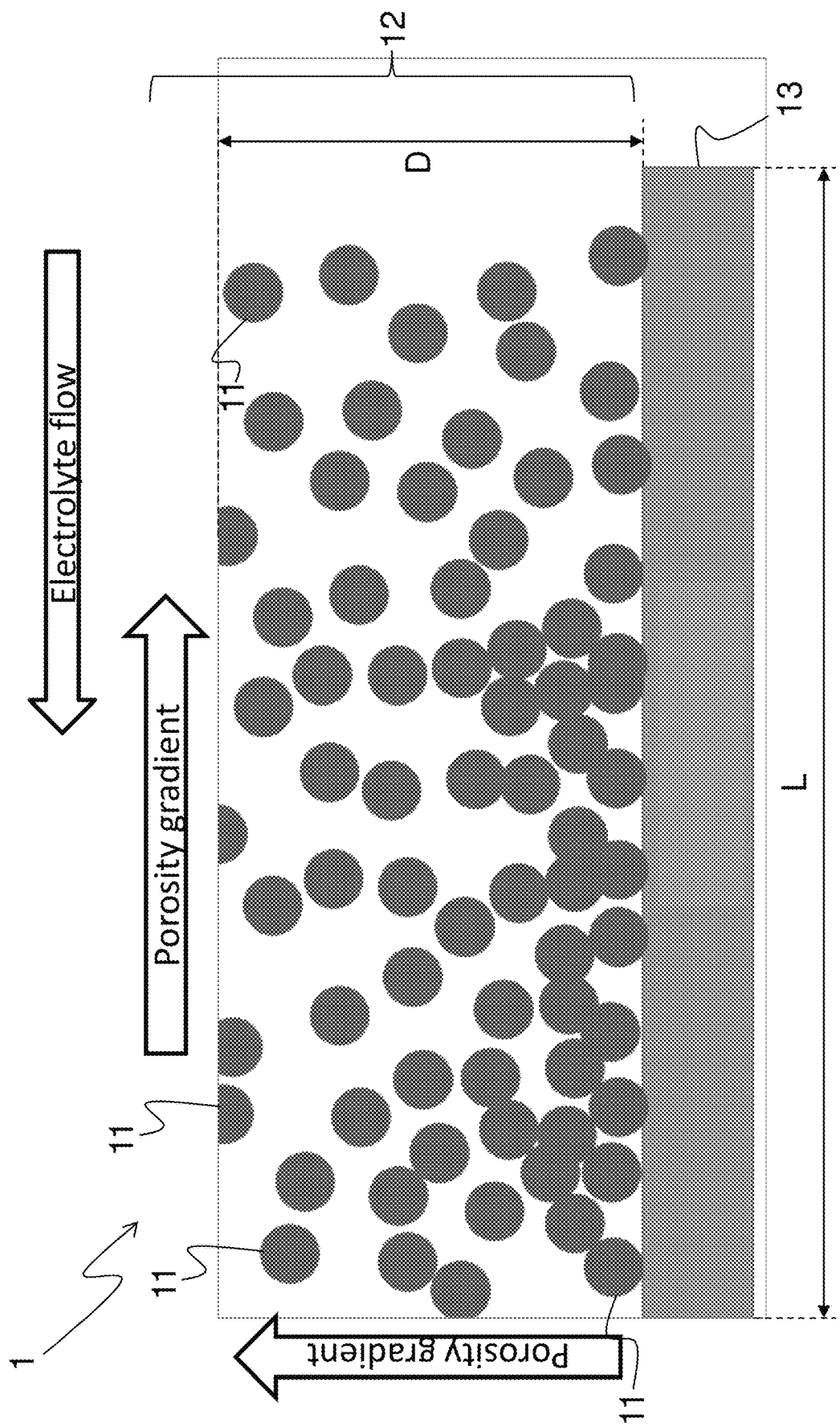
FIG. 3 shows a schematic representation of the electrode of FIG. 1.

Also with reference to FIG. 3, the following will describe one possible embodiment of the electrode 1. The electrode 1 comprises a first portion 12 and a second portion 13, wherein said first portion mainly consists of carbon particles 11 with a concentric-layered structure, and wherein the second portion 13 is preferably a carbon electrode according to the prior art.

It must be pointed out that, for illustrative reasons, the second portion is represented schematically as a planar layer, so as to better highlight graphically the aspects concerning the porosity of the first portion 12 without any complication due to the (fibrous) structure of the carbon fiber that preferably constitutes the second portion 13 of the electrode 1.

The thickness of said first portion 12 is in the range of 0.01 μm to 1,000 μm, preferably 0.1 μm to 50 μm. Even more preferably, the thickness of said first portion of the electrode is in the range of 0.5 μm to 10 μm. According to a preferred embodiment, the thickness of the first portion 12 of the electrode is in the range of 1 μm to 6 μm.

Regardless of the starting active species to be used, the internal porosity may be varied along a depth D of the first portion 12 of said electrode 1 up to a depth of 10% to 90% the total thickness of said first portion.

More in detail, the porosity varies along the depth D of said first portion 12, and preferably the porosity varies according to a gradient of 0% to 80% every 100 nanometers. This gradient permits increasing the redox reactions in those regions of the first portion 12 of the electrode 1 which are closer to the second portion 13 of the electrode 1, where the concentration of ions that can be oxidized or reduced is lower, and therefore the porosity must be lower; such regions are located in proximity to the second portion 13 of the electrode 1, because in such regions the electrolyte has already met the outermost particles of the first portion 12 of the electrode 1 and therefore has already undergone a decrease in the concentration of ions ready to be oxidized or reduced.

This makes it possible to reduce the electric potential differences between the surface of the first portion 12 of the electrode 1 which is farther from the second portion 13 and the surface of said first portion 12 which is closer to said second portion 13, thus advantageously minimizing the intensity of the electric currents within the electrode 1, which impair the efficiency of the electrode 1 by reducing the maximum transportable current.

Moreover, the presence of this gradient promotes the electrolyte flow by allowing the electrolyte to fully permeate the first portion 12 of the electrode 1. This advantageously permits the use of an electrode having a large area of contact with the electrolyte, while at the same time ensuring a constant renewal of the electrolyte.

In this manner, it is advantageously possible to increase the power and energy density in a flow battery.

As an alternative to or in combination with the above, the porosity and thickness of the first portion 12 may be varied along a length L and/or a depth D of the electrode 1.

In particular, the porosity may vary along the length L of said first portion, preferably by a percent value of 0% to 80% of a predefined porosity value per millimeter of the length L of the electrode 1, and/or the porosity may vary along the depth D of the electrode 1, preferably by a percent value in the range of 0% to 80% of the predefined porosity value per micron of the depth D of the electrode 1.

Also this gradient is useful to minimize the overpotential of the redox reactions in those regions of the first portion 12 of the electrode 1 where the concentration of ions that can be oxidized or reduced is lower, thus requiring less porosity and hence a larger active surface, i.e., a greater number of active sites; such regions are located in the area of the electrode 1 that is last touched by the flow of electrolyte, because in such regions the electrolyte has already met a large part of the first portion 12, and therefore has already undergone a decrease in the concentration of ions ready to be oxidized or reduced.

In this manner, it is advantageously possible to increase the power and energy density in a flow battery.

The first portion 12 of the electrode 1 has a specific area (preferably measured in accordance with the BET method) of at least 500 m$^2$/g, preferably at least 600 m$^2$/g, and even more preferably 61.0 m$^2$/g, and a roughness factor (i.e., area per volume unit) of at least 20 μm$^{-1}$, preferably at least 200 μm$^{-1}$, and even more preferably 285 μm$^{-1}$.

Just like particle size and porosity, the roughness factor may be uneven through the thickness of the first portion 12 of the electrode 1. According to a preferred embodiment, the roughness factor of said first portion 12 may vary, according to a gradient, from 20 to 500 μm$^{-1}$. This makes it possible to keep homogeneous and/or constant the redox reactions in the different regions of the first portion 12 of the electrode 1 as the concentration of ions ready to be oxidized or reduced changes.

In this manner, it is advantageously possible to increase the power and energy density in a flow battery.

As previously described, the carbon particles constituting the first portion 12 of the electrode 1 have a concentric-layered structure with a diameter preferably comprised in the range of 2 to 100 nanometers, more preferably 3 to 7 nanometers. In addition, the first portion 12 of the electrode 1 has a thickness preferably comprised in the range of 0.1 to 100 μm, more preferably 1 to 10 μm. Along such thickness, the porosity between the assembled particles is in the range of 1 to 100 nm. The first portion 12 is supported by the second portion, which preferably comprises a commercial electrode made of carbon fiber.

Figure 4:
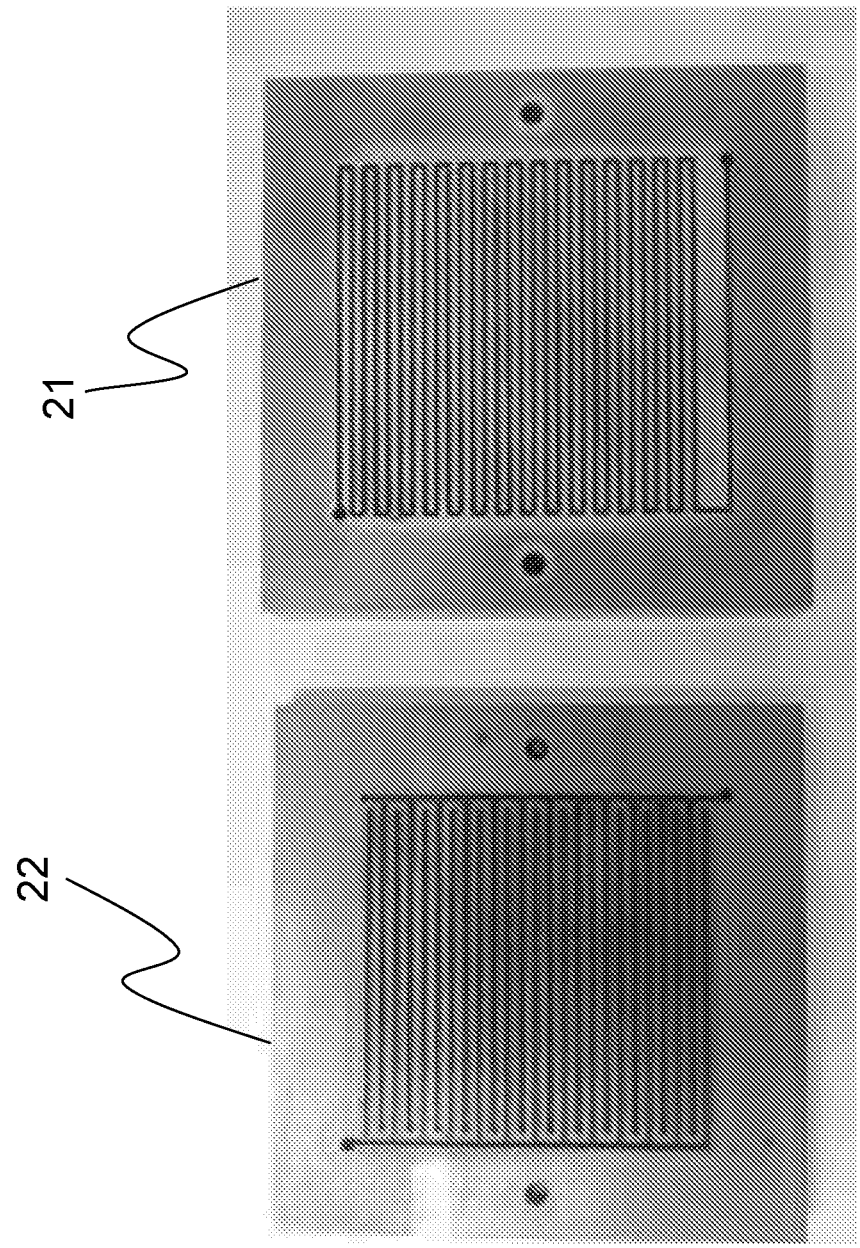
FIG. 4 shows two different types of flow distributors that may be used in the battery of FIG. 1.

Also with reference to FIG. 4, the electrode 1 according to the invention is preferably coupled to a flow distributor, such as, for example, a serpentine flow distributor 21 or an interdigitated flow distributor 22.

The flow distributor 21,22 allows the electrolyte flow to be distributed on the electrode 1 after said flow of electrolytic solution has come out of one of the tanks T1,T2 under the action of one of the pumps P1,P2. It must be pointed out that the distribution of the flow of electrolytic solution on the electrode 1 entails diffusing said electrolytic solution through most of the porous volume of said electrode 1.

When the electrode 1 is used as the negative pole in a flow battery in which the electrolytes contain vanadium ions, the obtainable power density is strictly correlated with a combination of factors like electrode thickness and type of flow distributor coupled to said electrode.

When the serpentine flow distributor 21 is used, the thickness of the first portion 12 of said electrode 1 is preferably comprised in the range of 0.5 μm to 5 μm, being more preferably 1 μm.

When the interdigitated flow distributor 22 is used, the thickness of the first portion 12 of said electrode 1 is preferably comprised in the range of 2 μm to 10 μm, being more preferably 4 μm.

Also when the electrode 1 is used as the positive pole in a flow battery in which the electrolytes contain vanadium ions, the obtainable power density is strictly correlated with the combination of electrode thickness and type of flow distributor coupled to said electrode. It must also be pointed out that the best results in terms of electrocatalysis are attained, on a lower scale, with the same combinations of thicknesses and flow distributors as described above.

The electrode 1 according to the invention has shown an electric conductivity in excess of 10$^5$ S·m.

Figure 5:
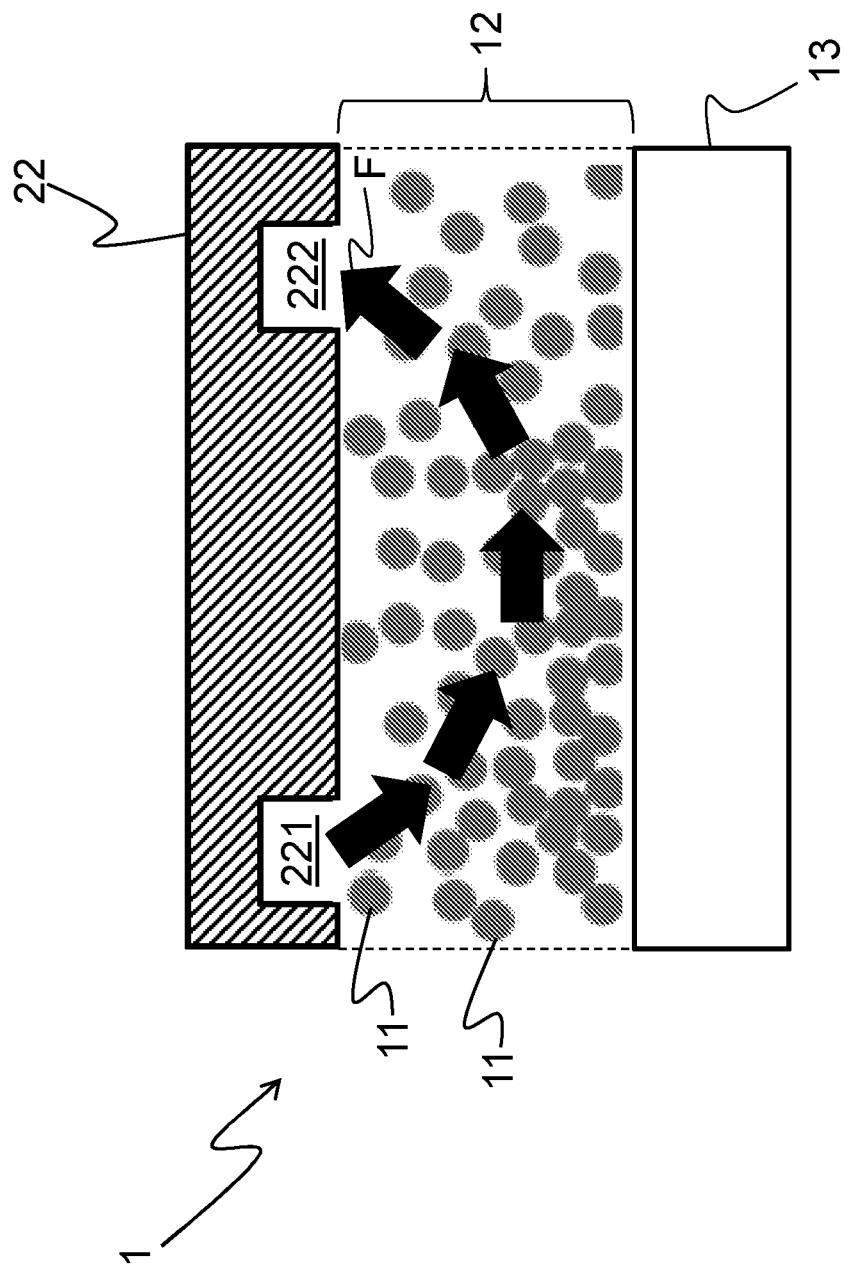
FIG. 5 shows a schematic representation of the electrode of FIG. 1 coupled to one of the flow distributors of FIG. 4.

With reference to FIG. 5, the following will describe how the electrolytic solution flows in the electrode 1 under the action of the interdigitated flow distributor 22.

As is known, the interdigitated flow distributor 22 comprises at least one grid of delivery ducts 221 and a grid of discharge ducts 222, which are open towards the outside (i.e., in operating conditions, towards the electrode 1), without however directly communicating with each other. With this conformation of the distributor it is advantageously possible to generate, when the distributor 22 is coupled to said electrode 1, at least one flow of electrolyte F within almost the entire electrode 1. This advantageously increases the quantity per time unit of redox reactions within the electrode 1 when a current is made to circulate across the electrodes 1 of the battery B.

In this manner, it is advantageously possible to increase the power and energy density in a flow battery.

Figure 6:
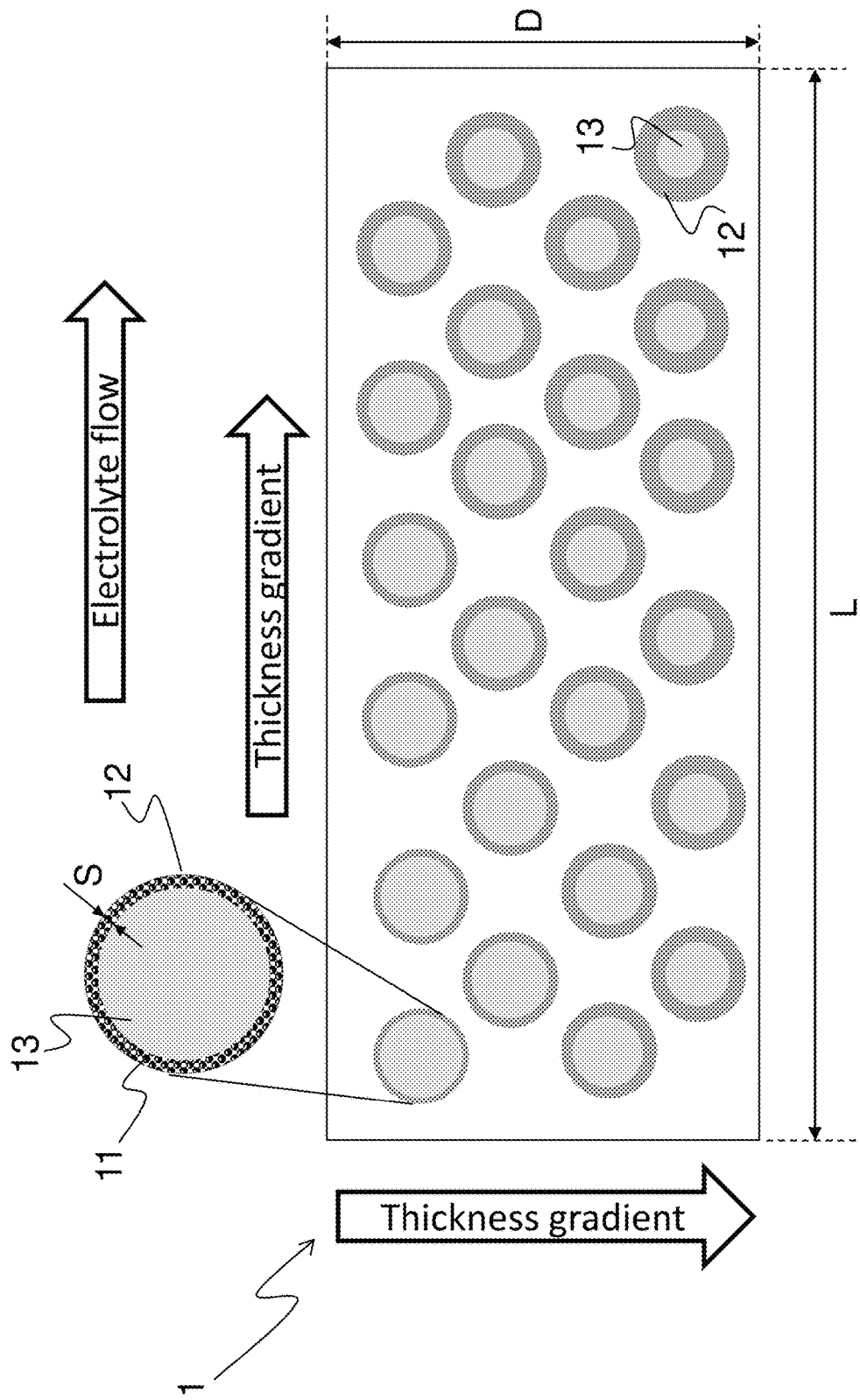
FIG. 6 shows a schematic sectional representation of the electrode of FIG. 1.
Figure 7:
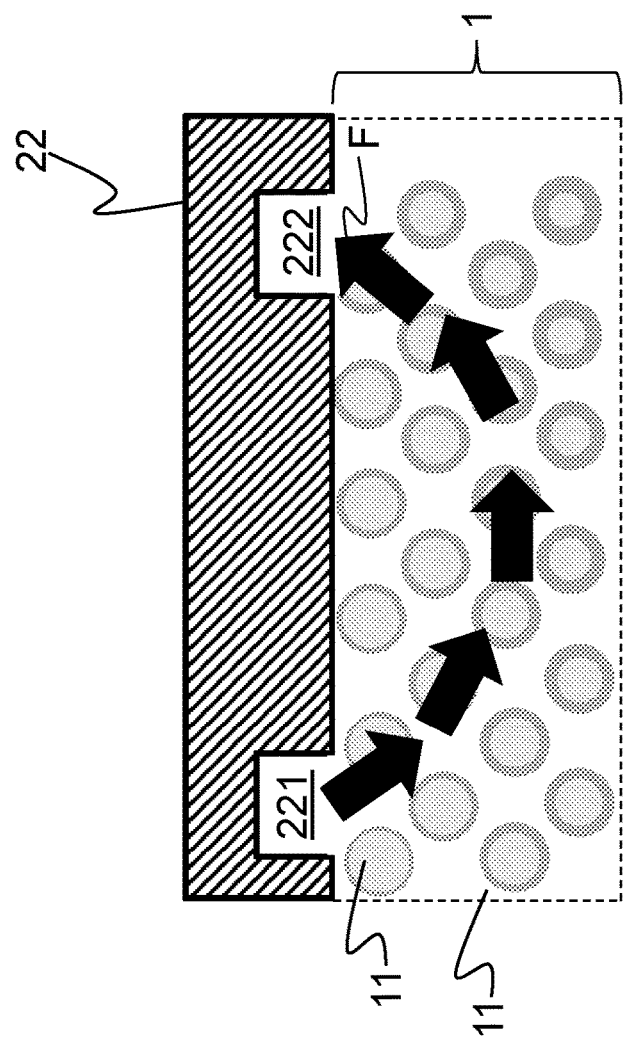
FIG. 7 shows a schematic sectional representation of the electrode of FIG. 1 coupled to one of the flow distributors of FIG. 4.
Figure 7:
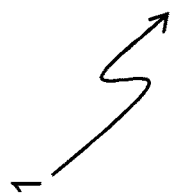

Also with reference to FIGS. 6 and 7, the following will describe the preferred embodiment of the electrode 1, wherein the second portion 13 of the electrode 1 consists of a carbon-fiber electrode, i.e., the second portion 13 comprises a plurality of carbon filaments.

In order to better describe the technical features associated with carbon fiber, it must be pointed out that FIGS. 6 and 2 show sectional views of the carbon-fiber filaments, without however representing (for clarity's sake) the gradients highlighted in FIGS. 3 and 5.

At least one of the filaments making up the second portion 13 of the electrode is coated with a layer of particles 11 that constitute the first portion 12 of the electrode. In other words, said second portion 13 comprises a plurality of carbon filaments, and wherein said first portion (12) coats, at least partly, at least one of said filaments with a layer of said particles 11.

This makes it possible to reduce the overpotential of the electrode 1 while at the same time improving the mechanical strength of the electrode, so as to increase the current and/or energy density of a flow battery.

Moreover, the layer of the first portion 12 has a thickness S that may vary depending on the position of the filament in the electrode 1.

More in detail, the higher the active species concentration in the electrolyte flow, the smaller the thickness S; conversely, the lower the active species concentration in the electrolyte flow, the greater the thickness S. In other words, the thickness 3 of the layer of said particles 11 varies along a depth D and/or a length L of said electrode 1.

The thickness S of the first portion 12 that surrounds the second portion 13 (i.e., the filaments) of the electrode 1 preferably varies by a quantity ranging from 10 nanometers to 1,000 nanometers per millimeter of the length L and/or by a quantity ranging from 10 nanometers and 1,000 nanometers per micron of the thickness D of the electrode 1.

Furthermore, the thickness S of the first portion 12 may vary around the same filament, e.g., according to the gradients highlighted in FIG. 5.

The electric potential differences in the electrode are thus reduced, thereby advantageously increasing the electric current that the electrode 1 can absorb or supply into the electrolyte, thus advantageously increasing the power and energy density in a flow battery.

The electrode 1 described herein can be fabricated by using different fabrication methods. In general, any film growth method may be employed which can deposit nanoparticles on a surface with controlled kinetic energy.

More in detail, such electrode 1 may be fabricated by deposition of nanoparticles through the use of a plasma source, sputtering systems, Pulsed Laser Deposition (FLD) systems, Plasma-Enhanced Chemical Vapor Deposition (PECVD) systems, atmospheric sprays, or the like.

In other words, a method for producing an electrode 1 according to the invention comprises the following phases:
a. a synthesis phase, wherein a plurality of particles of electrically conductive material having nanometric dimensions are synthesized;
b. a deposition phase, wherein said plurality of particles are used for forming the first portion of said electrode 1.

The electrode 1 as described above may be fabricated by creating a plasma-assisted supersonic source of particles, as described in international patent application publication WO 20111/064392 A2 by UNIVERSITA DEGLI STUDI DI MILANO BICOCCA; such method envisages the use of a device capable of generating, preferably by means of reactive plasma, an aerosol of nanoparticles in a first chamber, separated from a second chamber by a sufficiently small orifice, so that, by keeping the chambers under different pressures, a gas jet at supersonic speed is generated which contains suspended particles. In order to maintain the pressure difference between said chambers, a pumping system is connected to one of the chambers. The chamber kept at a higher pressure (referred to as "synthesis chamber") comprises a pair of electrodes supplied by a signal generator (also known as "RF signal generator"), thus creating, de facto, a limited space in which there is an electromagnetic field preferably produced by the signal generator; between the two electrodes (i.e., within said limited space) a gas mixture is injected, which comprises at least one carbon-containing gas, e.g., acetylene ($C_2H_2$). More in detail, said mixture is preferably composed of 99.63% argon (Ar) and 0.38% acetylene ($C_2H_2$). The RF signal generator is configured for generating a signal preferably having a frequency of 13.56 MHz and a power of at least 20 Watts, preferably 120 Watts. This causes the acetylene molecules flowing across the electrodes to dissociate into radicals that, being in an inert argon atmosphere (i.e., with a negligible quantity per time unit of oxygen), will start polymerizing into clusters of a few atoms, and hence into nanoparticles. The particles thus synthesized are then collected by the supersonic jet and accelerated in the lower-pressure chamber (also referred to as "impact chamber"). In operation, the pressure in the synthesis chamber is preferably kept at 130 Pascals, while the pressure in the impact chamber is preferably kept at 2 Pascals.

As an alternative to the RF signal generator and the two electrodes, which produce reactive plasma when supplied by said generator, it is possible to use other heating systems, such as a hot filament (e.g., heated by Joule effect) or a high-power lamp.

Depending on the power at which the process of synthesizing carbon nanoparticles occurs, the latter may be either graphitic or hydrogenated. In the latter case, such material must be subjected to a high-temperature thermal treatment (i.e., higher than 700° C., preferably higher than 1,000° C.) to obtain fully graphitic carbon.

Deposition may occur on a sacrificial substrate (i.e., a substrate that will subsequently be removed, and therefore will not be a part of the finished electrode 1), or may occur on a commercial electrode, preferably a carbon-fiber electrode, e.g., the Sigracet® 29AA type, and more preferably on both sides of said electrode, so as to obtain, advantageously, maximum cladding coverage.

If deposition occurs on a carbon-fiber electrode (i.e., on carbon filaments), during the deposition phase said electrode (i.e., the second portion 13) may be rotated and/or translated at a speed determined on the basis of the thickness S of the first portion 12 to be obtained. In other words, during the deposition phase said first portion 12 is deposited on the second portion 13 comprising a plurality of carbon filaments, so that said first portion 12 will form a layer on at least one of said carbon filaments, and said second portion 13 is rotated and/or translated at a speed determined on the basis of a desired thickness of said layer.

In this manner, by varying said speed it is possible to obtain one or more of the above-described gradients, so as to reduce the electric potential differences in the electrode 1 and thus increase the current and/or energy density of a flow battery.

It should be noted that the carbon fibers that constitute the electrode advantageously allow the jet of nanoparticles to fully cross the body of the second portion 13, thus permitting a complete functionalization of the filaments. Moreover, the jet of nanoparticles may be deposited on both sides of the initial electrode, whether by rotating the electrode inside the impact chamber after the first surface has been functionalized, so that all filaments can be coated in a more or less uniform manner, or by using two sources on both sides of the electrode. It is also possible to deposit a greater thickness on one side, thereby obtaining one or more of the previously described gradients.

As already described above, the power of the generated RF signal is preferably in the range of 20 to 1,000 Watts, and more preferably is 120 Watts, while its frequency is preferably 13.56 MHz. More in general, the power of the RF signal per surface unit of the electrode 1 is preferably in the range of 0.1 to 30 Watt/cm, more preferably 1.6 to 8 Watt/cm$^2$.

This makes it possible to maximize the roughness (i.e., the area per volume unit) of the cladding of nanometric particles.

Figure 8:
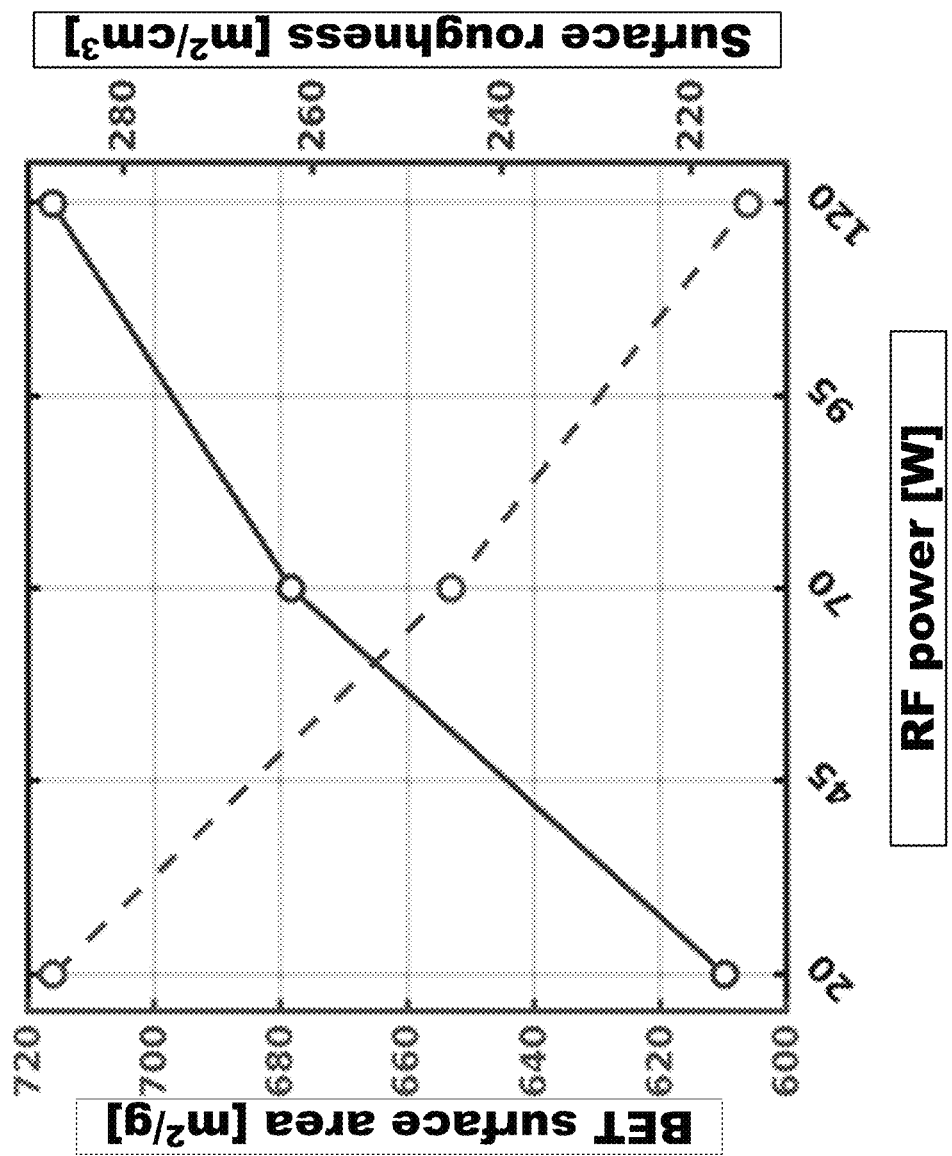
FIG. 8 shows a graph representing the trend of the area per mass unit and of the area per volume unit of the particles of the electrode of FIG. 1 as a function of the power of the radio frequency waves used during the process of producing said electrode.

This effect can be appreciated in the images shown in FIGS. 2(a)-2(c), which illustrate a first portion of the electrode 1 (i.e., the concentric-layered particles 11 that constitute it) produced by using, respectively, 20 W, 70 W and 120 W power levels on a standard-size electrode. FIG. 8 shows the trends of the roughness factor and the BET specific area for different RF power levels. It can be noticed that higher RF power results in an increased roughness factor and a reduced BET specific area, and that the roughness factor and the BET specific area are strictly correlated with the delivered RF power.

In other words, during the synthesis phase the power of the radio-frequency signal outputted by the RF signal generator is determined on the basis of a roughness factor that describes a (desired) roughness of the first portion 12 of the electrode 1.

The roughness factor can thus be controlled to reduce the electric potential differences in the electrode and therefore increase the current and/or energy density of a flow battery.

In addition or as an alternative to the above, during the deposition phase it is possible to vary and/or control a roughness factor that describes the active area density per volume unit of the first portion 12 of the electrode 1 (i.e., of the assembled nanoparticles; by causing a flow of said particles to impact against the first portion 12 of the electrode 1 at a speed determined on the basis of a desired roughness factor that describes the desired active area density per volume unit of the first portion 12 of the electrode 1. The speed can be determined and/or controlled by varying the temperature of the synthesis chamber and/or of the electrode 1 positioned in the impact chamber, and/or by varying the pressure difference between said chambers and/or the distance between the surface of the electrode 1 whereon deposition occurs and the nozzle through which the nanoparticles come out, and/or the like.

By controlling the roughness factor, it is possible to reduce the electric potential differences in the electrode and therefore increase the current and/or energy density of a flow battery.

Figure 9:
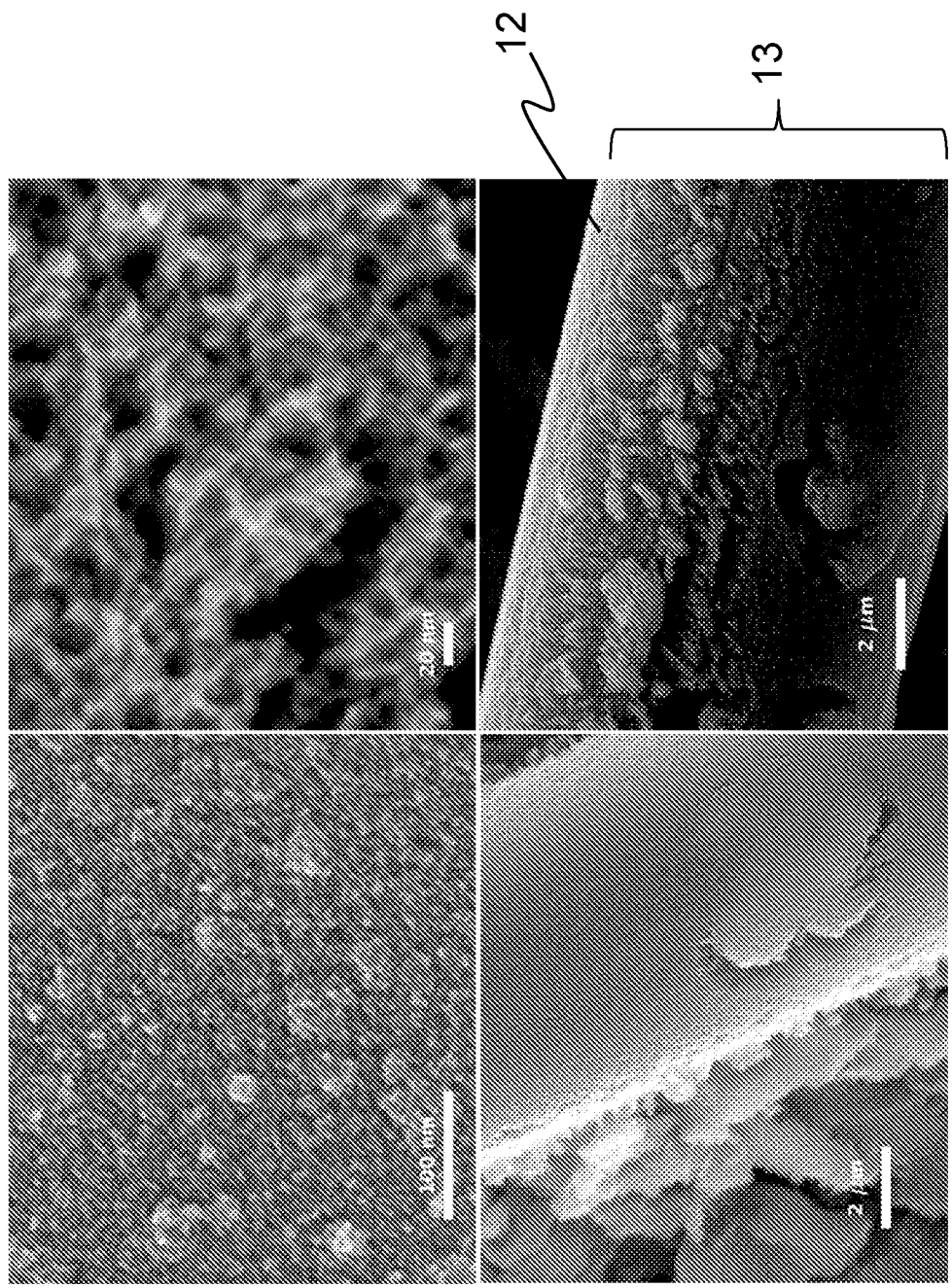
FIG. 9 shows four images acquired by a scanning electron microscope, which represent, at different magnification levels, different portions of the preferred embodiment of the electrode according to the invention.

FIG. 9 shows (at different magnification levels) an electrode 1 comprising a first portion with a roughness factor of 285 μm$^{-1}$ deposited on the second portion 13 consisting of a 29AA electrode used as a support substrate. This electrode was tested in actual working conditions for use in a flow battery using vanadium as the active element.

These tests highlighted that an electrode according to the invention having a thickness of 4 μm and coupled to an interdigitated flow distributor provides the highest current value per surface unit in contact with the electrolytic solution, while an electrode according to the invention having a thickness of 1 am and coupled to a serpentine flow distributor provides the highest current value per surface unit in contact with the electrolytic solution.

More in detail, a cell was tested which had, as the negative pole, an electrode 1 according to the invention coupled to an interdigitated flow distributor 22, wherein said electrode had a first portion 12 having a thickness of 4 μm, and, as the positive pole, and electrode according to the prior art coupled to a second interdigitated flow distributor 22. By executing charge/discharge cycles, it was possible to observe that the electrode 1 coupled to the interdigitated flow distributor 22 could reduce the overpotential in comparison with an untreated electrode. Therefore, the discharge current being equal, the coupling of the electrode 1 according to the invention to the interdigitated flow distributor 22 can increase the efficiency and prolong the depth of discharge, thus increasing the (usable) capacity of the battery B.

After calculating the high-frequency resistance (HFR) parameter by measuring the electrochemical impedance spectroscopy (ETS), it was possible to subtract the contribution of the ohmic losses of the ion-exchange membrane to make the so-called IR correction. With this correction, it was possible to observe that the electrode 1, which had an area in contact with the electrolyte of 25 cm$^2$, coupled to the interdigitated flow distributor 22, could reach very high efficiency values in excess of 80% in the presence of a discharge current per surface unit of 300 mA/cm$^2$ and in the presence of a flow of electrolyte having a volumetric flow rate of 100 milliliters per minute. It should be noted that, under the same operating conditions, an electrode according to the prior art, i.e., without the layer of nanoparticles and with the same (macroscopic) area in contact with the electrolyte (25 cm$^2$), reached a discharge current value per surface unit of 100 mA/cm$^2$ with an efficiency value in excess of 80%. It is therefore possible to triplicate the power density of a vanadium flow battery by coupling the interdigitated flow distributor 22 to an electrode 1 according to the invention instead of an electrode according to the prior art.

In combination with the above, the electrode 1 may be coated with a nanometric layer (0.1-50 nm thick) optimized for specific functions, such as, for example, reducing the formation of hydrogen on the negative-pole electrode and/or increasing the high-voltage stability of the positive-pole electrode. In general, the cladding may be composed of materials that are stable under the pH and voltage conditions of the positive or negative electrode, having a high catalytic activity towards the redox reactions of vanadium while being inactive as concerns hydrogen evolution, such as graphene, reduced graphene oxide, titanium nitride (TiN), titanium oxynitrides, titanium oxides (TiO$_x$, 0<x<21, molybdenum oxides (MoO$_x$ with 0<x<3), tungsten oxides (WO$_x$ 0<x<3), tungsten oxynitrides, tungsten nitride, tin oxides (SnO$_x$, 0<x≤2), indium and indium oxides, bismuth, tellurium, manganese, niobium, yttrium, zirconium, hafnium, gallium, lead, lanthanum, cerium and/or other lanthanides, titanium, molybdenum, tungsten, iron, aluminium, silicon, germanium, boron, silver and oxides thereof, borides, nitrides, carbides and chalcogenides; other possible functionalizations can be obtained by using anionic groups such as O, N, F, P, S, Cl, Se, Br, I and compounds thereof (e.g., sulphur and oxygen, nitrogen and oxygen, phosphorus and oxygen, or chlorine and oxygen compounds) and organic functional molecules. Such cladding is chosen in order to reduce the degradation of the electrode 1 and/or its reactivity towards the water oxidation reaction, resulting in production of $O_2$ or reduction thereof with production of $H_2$. Moreover, the optimized claddings make it possible to reduce the minimum potential on the negative electrode while increasing the maximum potential on the positive one, thus extending the maximum voltage range within which the battery can be made to operate. This advantageously permits the delivery or absorption of a higher electric current. It is thus possible to increase the service life of the battery B, providing more effective peak shaving, load shifting and market arbitration (i.e., storing large amounts of electric energy when it is available at low cost for re-selling it at a later time at a higher price), etc.

Of course, the example described so far may be subject to many variations.

Some of the possible variants of the invention have been described above, but it will be clear to those skilled in the art that other embodiments may also be implemented in practice, wherein several elements may be replaced with other technically equivalent elements. The present invention is not, therefore, limited to the above-described illustrative examples, but may be subject to various modifications, improvements, replacements of equivalent parts and elements without however departing from the basic inventive idea, as specified in the following claims.

The invention claimed is:

1. An electrode for a flow battery, comprising:
    a first portion that can be placed in contact with an electrolytic solution of said battery (B), wherein said first portion is mesoporous and consists of particles of electrically conductive material having nanometric dimensions; and
    a second portion that supports said first portion and includes a plurality of carbon filaments, wherein said first portion coats, at least partly, at least one of said filaments with a layer of said particles,
    wherein the layer of said particles has a thickness that varies along a depth and/or a length of said electrode, and/or the first portion has a porosity that varies along a depth and/or a length of said electrode.

2. The electrode according to claim 1, wherein:
    said first portion is formed by carbon particles, and
    said particles have a concentric-layered structure.

3. The electrode according to claim 2, wherein the particles have a size in the range of 1 to 100 nanometers.

4. The electrode according to claim 3, wherein the particles have a size in the range of 3 to 7 nanometers.

5. The electrode according to claim 1, wherein the first portion includes pores having an average size in the range of 2 to 50 nanometers.

6. The electrode according to claim 1, wherein the first portion has a thickness in the range of 0.5 μm to 10 μm.

7. The electrode according to claim 1, wherein the first portion of the electrode has a specific area of at least 500 m2/g and an area per volume unit of at least 20 μm−1.

8. A flow battery comprising at least one electrode according to claim 1.

9. The flow battery according to claim 8, wherein said electrode is configured to operate as the negative pole of said battery.

10. The flow battery according to claim 8, further comprising a serpentine flow distributor coupled to the electrode (1), wherein the first portion of said electrode has a thickness in the range of 0.5 μm to 5 μm.

11. The flow battery according to claim 8, further comprising an interdigitated flow distributor coupled to the electrode, wherein the first portion of said electrode has a thickness in the range of 2 μm to 10 μm.

12. A method for producing an electrode according to claim 1, comprising:
    a synthesis phase, wherein a plurality of particles of electrically conductive material having nanometric dimensions are synthesized, and
    a deposition phase, wherein said plurality of particles are used for forming a first portion of said electrode.

13. The method according to claim 12, wherein:
    during the synthesis phase, said plurality of particles are synthesized by causing a gas mixture to flow through a limited space in which an electromagnetic field is present, and
    said gas mixture includes at least one carbon-containing gas.

14. The method according to claim 12, wherein, during the deposition phase, a flow of said particles is caused to impact against the first portion of the electrode at a speed determined on the basis of a roughness factor that describes a roughness of the first portion of the electrode.

15. The method according to claim 12, wherein:
    during the deposition phase, said first portion is deposited on a second portion including a plurality of carbon filaments, so that said first portion forms a layer on at least one of said carbon filaments, and
    said second portion is rotated and/or translated at a speed determined on the basis of a desired thickness of said layer.

16. The electrode according to claim 1, wherein:
    said first portion is formed by carbon particles, and
    said particles have a concentric-layered structure.

17. The electrode according to claim 1, wherein the first portion includes pores having an average size in the range of 2 to 50 nanometers.

18. The electrode according to claim 1, wherein the first portion has a porosity that varies along a depth and/or a length of said electrode.

* * * * *